(12) United States Patent
Priwisch et al.

(10) Patent No.: US 12,474,393 B2
(45) Date of Patent: Nov. 18, 2025

(54) TERAHERTZ PROBE

(71) Applicant: Samsung Electronics Co., Ltd., Suwon-si (KR)

(72) Inventors: Martin Priwisch, Suwon-si (KR); Alexander Michalski, Aachen (DE); Michael Nagel, Aachen (DE); Namil Koo, Suwon-si (KR); Suhwan Park, Suwon-si (KR); Junbum Park, Suwon-si (KR); Inkeun Baek, Suwon-si (KR); Jongmin Yoon, Suwon-si (KR); Yoonkyung Jang, Suwon-si (KR); Ikseon Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 18/134,731

(22) Filed: Apr. 14, 2023

(65) Prior Publication Data

US 2023/0417820 A1 Dec. 28, 2023

(30) Foreign Application Priority Data

Jun. 22, 2022 (KR) .................. 10-2022-0076454

(51) Int. Cl.
    *G01R 31/265* (2006.01)
    *G01R 1/07* (2006.01)
    *G01R 29/08* (2006.01)

(52) U.S. Cl.
    CPC ........... *G01R 31/2656* (2013.01); *G01R 1/07* (2013.01); *G01R 29/0878* (2013.01)

(58) Field of Classification Search
CPC .. G01R 31/2656; G01R 1/07; G01R 29/0878; G01R 31/2822; G01R 31/3025; G01R 31/311; G01N 21/3586; H01Q 1/22; H01Q 1/38
USPC ...................................... 324/754.31
See application file for complete search history.

(56) References Cited

U.S. PATENT DOCUMENTS

| | | |
|---|---|---|
| 5,969,821 A | 10/1999 | Muramatsu et al. |
| 6,528,780 B1 | 3/2003 | Mitsuoka et al. |
| 7,623,746 B2 | 11/2009 | Naughton et al. |
| 8,881,311 B2 | 11/2014 | Raschke et al. |
| 10,145,799 B2 | 12/2018 | Zhang et al. |

(Continued)

FOREIGN PATENT DOCUMENTS

DE      102010018812 A1    11/2011

*Primary Examiner* — Raul J Rios Russo
(74) *Attorney, Agent, or Firm* — Muir Patent Law, PLLC

(57) ABSTRACT

According to embodiments, a cantilever is provided. The cantilever includes a first conductive line, a second conductive line, and a third conductive line extending on the substrate, a microtip arranged on the substrate, and an emitter antenna arranged on the microtip, connected to the first to third conductive lines, and configured to produce a scattering signal of a terahertz wave band, wherein the emitter antenna includes a first emitter electrode connected to the first conductive line, a second emitter electrode connected to the second conductive line and adjacent to the first emitter electrode, a third emitter electrode connected to the third conductive line and spaced apart from the first emitter electrode with the second emitter electrode in-between, and a scattering part connecting the first and second emitter electrodes with each other.

17 Claims, 5 Drawing Sheets

(56) References Cited

U.S. PATENT DOCUMENTS

| | | |
|---|---|---|
| 10,260,868 B2 | 4/2019 | Gevigney et al. |
| 11,016,119 B1 | 5/2021 | Ukhanov et al. |
| 2009/0087930 A1* | 4/2009 | Arai .................. G01R 31/3025 |
| | | 257/E21.531 |
| 2009/0195786 A1 | 8/2009 | Gastaldo |
| 2012/0261575 A1* | 10/2012 | Averitt ................. H10F 39/107 |
| | | 250/353 |
| 2019/0078938 A1* | 3/2019 | Favero ...................... G01J 5/10 |
| 2021/0263069 A1 | 8/2021 | Brueck et al. |

* cited by examiner

TERAHERTZ PROBE

CROSS-REFERENCE TO RELATED APPLICATION

This application is based on and claims priority under 35 U.S.C. § 119 to Korean Patent Application No. 10-2022-0076454, filed on Jun. 22, 2022, in the Korean Intellectual Property Office, the disclosure of which is incorporated by reference herein in its entirety.

BACKGROUND

Aspects of the inventive concept relate to a cantilever (e.g., probe), and more particularly, to a cantilever including an antenna having an asymmetrical structure.

With the recent rapid development of technology for generating and detecting terahertz waves, THz-related application research is being conducted in various fields, such as biology, chemistry, mechanical engineering, and radio communication engineering. Unlike X-rays, which caused damage and/or physical changes to samples or test subjects due to strong energy, terahertz waves, which are non-ionized electromagnetic waves with low-level energy, are less likely to cause physical changes or damage to test subjects. Accordingly, a terahertz wave test has been variously applied to the field of non-contact and non-destructive tests.

Representative applications of terahertz waves in the semiconductor industry are wafer thin film inspection and quality evaluation of integrated circuits and semiconductor packages. Here, the wafer-level film inspection includes a non-contact type of the measurement of surface resistance. Terahertz waves, although they do not penetrate thick metal patterns, may well penetrate thin metal layers and polymer materials, and may be used for wafer-level testing, integrated circuit testing, and package testing. In addition, an inspection method using terahertz waves is able to proceed to a free space and thus does not need to provide a medium, and does not need to be in contact with (i.e., directly in touch without intervening elements present at the point of contact) an inspection object, thereby facilitating the application of a non-contact inline process.

SUMMARY

Aspects of the inventive concept provide a cantilever (e.g., "probe," "terahertz probe," or "terahertz scattering probe") with improved resolution.

According to embodiments of the inventive concept, there is provided a cantilever. The cantilever includes a substrate, a first conductive line, a second conductive line, and a third conductive line extending on the substrate, a microtip arranged on the substrate, an emitter antenna arranged on the microtip, connected to the first to third conductive lines, and configured to produce a scattering signal of a terahertz wave band, and a detector antenna arranged on the microtip, and adjacent to the emitter antenna, wherein the emitter antenna includes a first emitter electrode connected to the first conductive line, a second emitter electrode connected to the second conductive line and adjacent to the first emitter electrode, a third emitter electrode connected to the third conductive line and spaced apart from the first emitter electrode with the second emitter electrode in-between, and a scattering part connecting the first and second emitter electrodes with each other.

According to other embodiments of the inventive concept, there is provided a cantilever. The cantilever includes a first conductive line, a second conductive line, and a third conductive line extending on a substrate, a microtip arranged on the substrate, an emitter antenna arranged on the microtip, connected to each of the first to third conductive lines, and configured to produce a scattering signal of a terahertz wave band, and a detector antenna arranged on the microtip and adjacent to the emitter antenna, wherein the first to third conductive lines include parts extending side by side.

According to other embodiments of the inventive concept, there is provided a cantilever. The cantilever includes a substrate, a microtip arranged on the substrate, an emitter antenna arranged on the microtip and configured to produce a scattering signal of a terahertz wave band, a first detector antenna arranged on the microtip, and adjacent to the emitter antenna, and a second detector antenna arranged on the microtip, and spaced apart from the first detector antenna with the emitter antenna in-between, wherein the emitter antenna includes a first emitter electrode, a second emitter electrode adjacent to the first emitter electrode, a third emitter electrode spaced apart from the first emitter electrode with the second emitter electrode in-between, and a scattering part connecting the first and second emitter electrodes with each other.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1A:
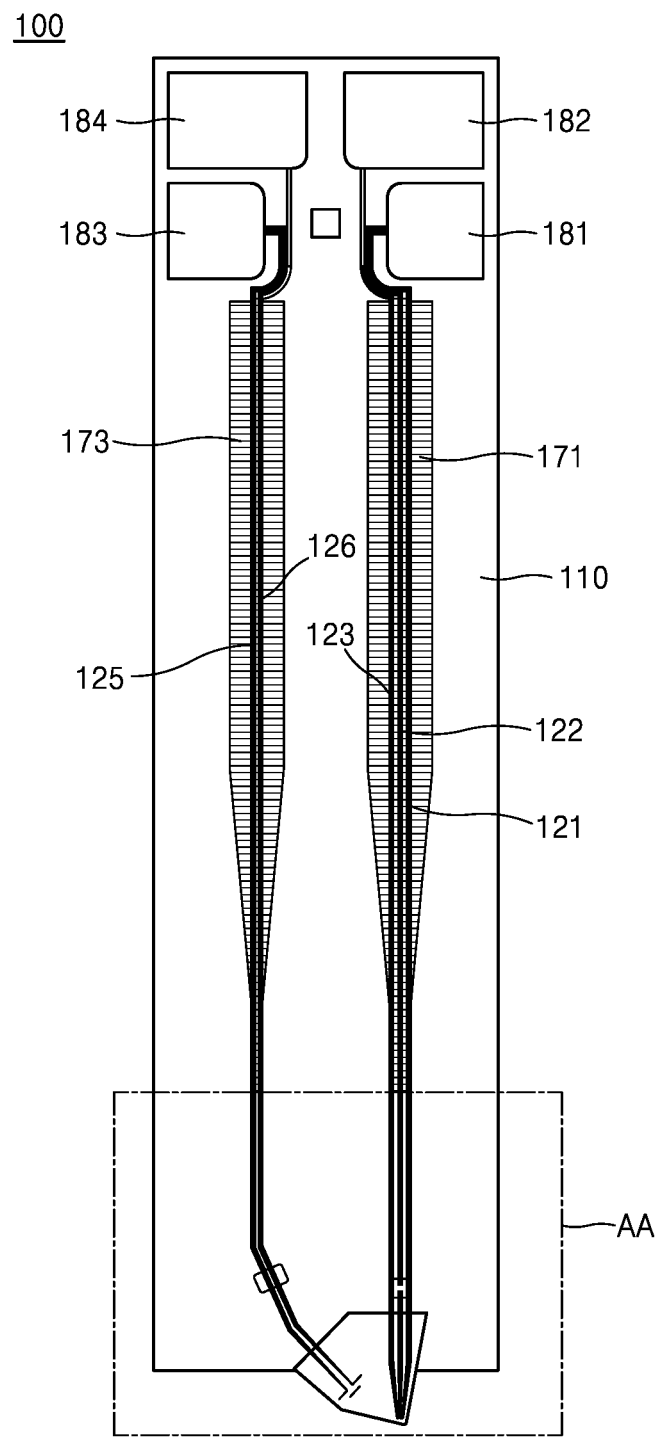
FIG. 1A is a schematic diagram for describing a cantilever according to embodiments.

Hereinafter, embodiments of the inventive concept will be described in detail with reference to the accompanying drawings. The same reference numerals are used for the same components in the drawings, and redundant descriptions thereof will be omitted.

FIG. 1A is a schematic diagram for describing a cantilever 100 according to embodiments.

Figure 1B:
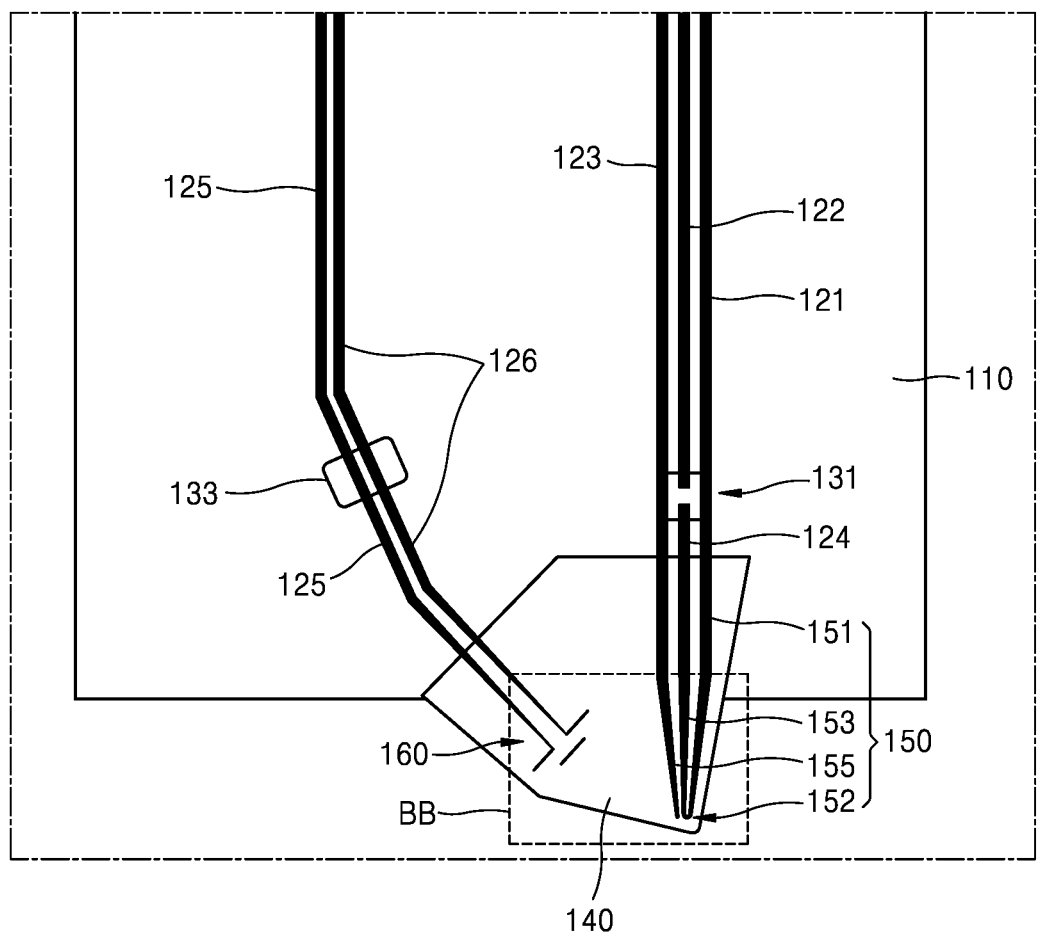
FIG. 1B is an enlarged view of a portion AA of FIG. 1A.

FIG. 1B is an enlarged view of a portion AA of FIG. 1A.

Figure 1C:
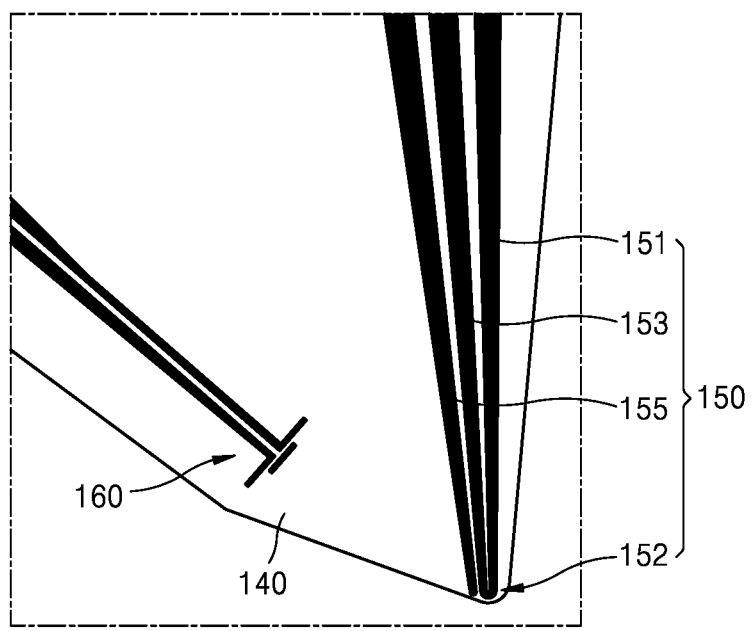
FIG. 1C is an enlarged view of a portion BB of FIG. 1B.

FIG. 1C is an enlarged view of a portion BB of FIG. 1B.

Referring to FIGS. 1A to 1C, the cantilever 100 may include a substrate 110, first to sixth conductive lines 121, 122, 123, 124, 125, and 126, a first photoconductive switch 131, a second photoconductive switch 133, a microtip 140, an emitter antenna 150, a detector antenna 160, absorbers 171 and 173, and patch electrodes 181, 182, 183, and 184.

According to embodiments, the substrate 110 may include an insulating material. According to embodiments, the substrate 110 may include an amorphous polymer. According to embodiments, the substrate 110 may include an optically transparent material. According to embodiments, the substrate 110 may include, for example, a cyclic olefin copolymer (COC) material.

As a non-limiting example, the substrate 110 may have a rectangular planar shape. Based on the description herein, one of ordinary skill in the art may vary the shape of the substrate 110 so as to adequately support elements of the cantilever 100.

The patch electrodes 181, 182, 183, and 184 may be configured to receive electrical signals and/or power from the outside, or to transmit electrical signals and/or power to the outside. Each of the patch electrodes 181, 182, 183 and 184 may be a pad for connection with external conductive lines, such as RF cables.

Each of the first to sixth conductive lines 121, 122, 123, 124, 125, and 126 may have a line shape. The first to sixth conductive lines 121, 122, 123, 124, 125, and 126 may be connected to the patch electrodes 181, 182, 183, and 184. The first to sixth conductive lines 121, 122, 123, 124, 125, and 126 may be configured to be electrically connected to the patch electrodes 181, 182, 183, and 184.

The first to sixth conductive lines 121, 122, 123, 124, 125, and 126 may include a conductive material, such as metal. However, aspects of the inventive concept are not limited thereto, and the first to sixth conductive lines 121, 122, 123, 124, 125, and 126 may include any conductive material, such as a conductive polymer, graphene, or the like.

The patch electrode 181 may be connected to the first conductive line 121. The patch electrode 182 may be connected to the second and third conductive lines 122 and 123. The patch electrode 183 may be connected to the fifth conductive line 125. The patch electrode 184 may be connected to the sixth conductive line 126.

According to embodiments, the first to fourth conductive lines 121, 122, 123, and 124 may be configured to have a co-planar waveguide structure. In more detail, the first to fourth conductive lines 121, 122, 123, and 124 may be configured to have a planar waveguide structure. Accordingly, the efficiency of signal transmission to the emitter antenna 150 through the first to fourth conductive lines 121, 122, 123, and 124 may be improved.

According to embodiments, the first to third conductive lines 121, 122, and 123 may include parts extending in parallel. According to embodiments, the first, third, and fourth conductive lines 121, 123, and 124 may include parts extending in parallel.

A first photoconductive switch 131 may be located between the second conductive line 122 and the fourth conductive line 124. The second conductive line 122 and the fourth conductive line 124 may be arranged in a row. Accordingly, the first photo-conductive switch 131 may be located between the second conductive line 122 and the fourth conductive line 124, such that the first photo-conductive switch 131 may be referred to as being integrated between the second conductive line 122 and the fourth conductive line 124.

The emitter antenna 150 may generate a terahertz-band signal based on an electrical signal (e.g., DC power) applied to the first to fourth conductive lines 121, 122, 123, and 124 and excitation light irradiated onto the first photo-conductive switch 131. When the excitation light is irradiated onto the first photoconductive switch 131, the first photoconductive switch 131 may be turned on, and thus a closed circuit including the first to fourth conductive lines 121, 122, 123, and 124 and the emitter antenna 150 may be formed. Since DC power is previously applied to the first to third conductive lines 121, 122, and 123 and the emitter antenna 150, when the first photoconductive switch 131 generates a light-induced carrier, the emitter antenna 150 may generate a terahertz band signal based on the electrical signal (e.g., the DC power) applied to the first to fourth conductive lines 121, 122, 123, and 124.

When the excitation light is not irradiated onto the first photoconductive switch 131, the first photoconductive switch 131 may be turned off, and thus, an electrical signal (e.g., DC power) for generating a scattering signal applied to the first to fourth conductive lines 121, 122, 123, and 124 may not be transmitted to the emitter antenna 150.

The emitter antenna 150 and the detector antenna 160 may be arranged on the microtip 140. The detector antenna 160 may be configured to detect a signal generated from the emitter antenna 150 and reflected by an inspection object (e.g., a semiconductor wafer). The detector antenna 160 may detect a surface reflection scattering signal.

According to embodiments, the microtip 140 may include a semiconductor material. According to embodiments, the microtip 140 may include a compound semiconductor. According to embodiments, the microtip 140 may include low temperature gallium arsenide or indium gallium arsenide.

According to embodiments, the emitter antenna 150 may be a non-vibration antenna. In other words, according to embodiments, the emitter antenna 150 may be configured to generate a signal for inspection without oscillation. According to embodiments, the emitter antenna 150 may be configured to generate a scattering signal.

Accordingly, the emitter antenna 150 and the detector antenna 160 may be arranged on a single microtip 140. In other words, the emitter antenna 150 and the detector antenna 160 may be arranged on the same microtip 140. Accordingly, the coupling efficiency between the emitter antenna 150 and the detector antenna 160 may be improved, and the resolution of the cantilever 100 may be improved.

According to embodiments, the emitter antenna 150 may include a scattering part 152 connecting the first to third emitter electrodes 151, 153, and 155 and the first and second emitter electrodes 151 and 153.

According to embodiments, the line width of each of the first to third emitter electrodes 151, 153, and 155 may decrease towards the scattering part 152. According to embodiments, the distance between any two of the first to third emitter electrodes 151, 153, and 155 may decrease towards the scattering part 152.

The second emitter electrode 153 may be located between the first and third emitter electrodes 151 and 155. The third emitter electrode 155 may be spaced apart from the first emitter electrode 151 with the second emitter electrode 153 in-between.

According to embodiments, the first emitter electrode 151 may be connected to the first conductive line 121. According to embodiments, the second emitter electrode 153 may be connected to the fourth conductive line 124. According to embodiments, the third emitter electrode 153 may be connected to the third conductive line 123.

According to embodiments, the first emitter electrode 151 may be configured to be electrically connected to the first conductive line 121. According to embodiments, the second emitter electrode 153 may be configured to be electrically connected to the fourth conductive line 124. According to embodiments, the third emitter electrode 153 may be configured to be electrically connected to the third conductive line 123.

According to embodiments, the scattering part 152 may connect the first and second emitter electrodes 151 and 153, but the second and third emitter electrodes 153 and 155 may not be directly electrically connected to each other. The second and third emitter electrodes 153 and 155 may be spaced apart from each other. A conductive element for directly electrically connecting the second and third emitter electrodes 153 and 155 may not be located between the second and third emitter electrodes 153 and 155. The first and second emitter electrodes 151 and 153 may include closed ends, and the second and third emitter electrodes 153 and 155 may include open ends. It will be understood that when an element is referred to as being "connected" or "coupled" to or "on" another element, it can be directly connected or coupled to or on the other element or intervening elements may be present. In contrast, when an element is referred to as being "directly connected," "directly electrically connecting," or "directly coupled" to another element, or as "contacting" or "in contact with" another element, there are no intervening elements present at the point of contact.

Accordingly, the emitter antenna 150 may have an asymmetrical structure, and a scattering signal may be generated by the emitter antenna 150. The scattering signal may be generated from the scattering part 152.

The scattering part 152 connects the first and second emitter electrodes 151 and 153 that may be separated from each other when the scattering part 152 is not present, and thus may be referred to as a short cut. The scattering part 152 may have a corner shape. The scattering part 152 may have a round shape. Accordingly, the shape of the scattering part 152 may be characterized by a radius.

According to embodiments, the radius of the scattering part 152 may have a value selected from a range of about 10 nm to about 10 µm. According to embodiments, the radius of the scattering part 152 may have a value selected from a range of about 50 nm to about 5 µm. According to embodiments, the radius of the scattering part 152 may have a value selected from a range of about 100 nm to about 3 µm.

The detector antenna 160 may be a dipole antenna. According to embodiments, the detector antenna 160 may be oblique to the emitter antenna 150. According to embodiments, the extending direction of the detector antenna 160 may be oblique to each of the first to third emitter electrodes 151, 153, and 155.

According to embodiments, the angle between the extending direction of the detector antenna 160 and the second emitter electrode 153 may have a value selected from a range of about 30 degrees to about 60 degrees. According to embodiments, the angle between the extending direction of the detector antenna 160 and the second emitter electrode 153 may have a value selected from a range of about 40 degrees to about 50 degrees. According to embodiments, the angle between the extending direction of the detector antenna 160 and the second emitter electrode 153 may be about 45 degrees.

The detector antenna 160 may be spaced apart from the scattering part 152 by a predetermined distance. The distance between the detector antenna 160 and the scattering part 152 may have a value selected from a range between about 100 µm and about 200 µm. The distance between the detector antenna 160 and the scattering part 152 may be about 150 µm or more. The distance between the detector antenna 160 and the scattering part 152 may be about 185 µm.

For example, an antenna based on the Yagi-Uda design uses propagating terahertz waves and has a wide field of view. A probe tip containing the Yagi-Uda antenna is limited in spatial resolution by wavelength, even though the probe tip is extremely close to the surface of the sample.

Inspection based on the scattering signal generally provides a higher resolution than inspection based on the propagating signal. However, since the signal strength of the scattering signal is lower than that of the propagation signal, a high signal strength and coupling coefficient are required. According to embodiments, by making the extending direction of the detector antenna 160 oblique with respect to the emitter antenna 150, the receiver of the detector antenna 160 and the transmitter 152 (i.e., the scattering part 152) of the emitter antenna 150 may be brought close to each other. Accordingly, the coupling efficiency between the detector antenna 160 and the emitter antenna 150 may be improved, and the resolution of the cantilever 100 may be improved.

According to experimental examples, it was confirmed that the characteristic resolution of the cantilever 100 including the emitter antenna 150 and the detector antenna 160 according to embodiments was about 18.8 µm, and the characteristic resolution of a cantilever including Yagi-Uda antennas having similar dimensions was about 73.6 µm. From the experimental examples, it was confirmed that the resolution of the cantilever 100 including the emitter antenna 150 and the detector antenna 160 according to embodiments was greatly improved.

The detector antenna 160 may be connected to the fifth and sixth conductive lines 125 and 126. The second photoconductive switch 133 may be connected to the fifth and sixth conductive lines 125 and 126. When the excitation beam is irradiated onto the second photoconductive switch 133, the second photoconductive switch 133 may be turned on, and thus, a signal detected by the detector antenna 160 may be transmitted through the fifth and sixth conductive lines 125 and 126. When the excitation beam is not irradiated onto the second photoconductive switch 133, the second photoconductive switch 133 may be turned off, and thus, a signal detected by the detector antenna 160 may not be transmitted through the fifth and sixth conductive lines 125 and 126.

According to embodiments, the first and second photoconductive switches 131 and 133 may include a semiconductor material. According to embodiments, the first and second photoconductive switches 131 and 133 may include a compound semiconductor. According to embodiments, the first and second photoconductive switches 131 and 133 may include low temperature gallium arsenide or indium gallium arsenide. The first and second photoconductive switches 131 and 133 manufactured based on low temperature gallium arsenide or indium gallium arsenide may have high carrier mobility in a low dark current and an excited state. Here, the dark current refers to a current flowing through the first and second photo-conductive switches 131 and 133 when excitation light is not irradiated onto the first and second photoconductive switches 131 and 133.

The first absorber 171 may cover the first to third conductive lines 121, 122, and 123. The second absorber 173 may cover the fifth and sixth conductive lines 125 and 126. The first and second absorbers 171 and 173 may reduce or prevent the generation of reflective signals in the first to sixth conductive lines 121, 122, 123, 124, 125, and 126.

Figure 2:
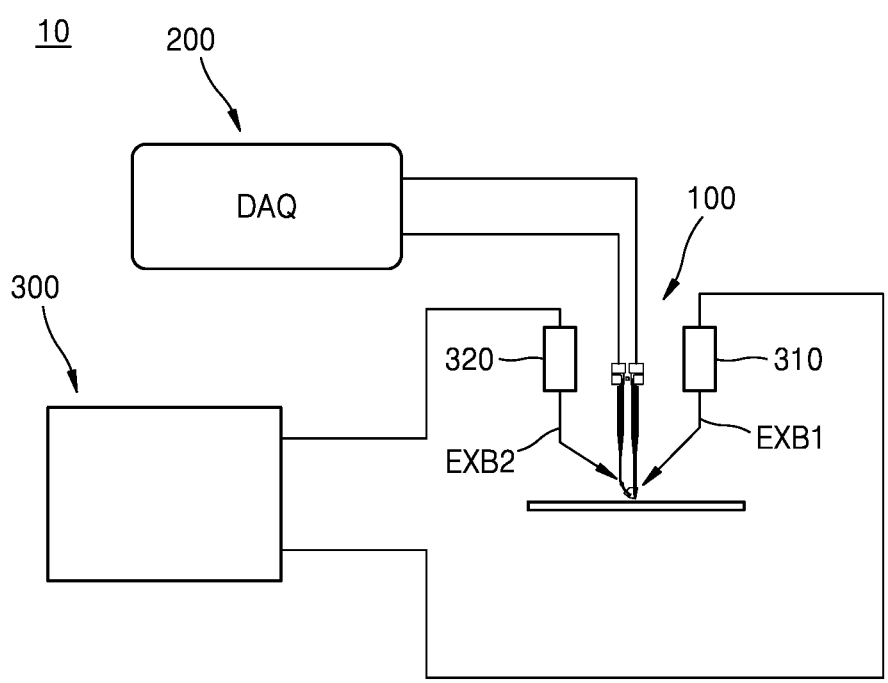
FIG. 2 is a diagram illustrating an inspection apparatus including a cantilever according to embodiments.

FIG. 2 is a diagram illustrating an inspection apparatus 10 including a cantilever 100 according to embodiments.

Referring to FIG. 2, the inspection apparatus 10 may include the cantilever 100, a data acquisition system 200, and an excitation device 300.

The inspection apparatus 10 may non-destructively inspect an inspection object, such as a wafer. The inspection object of the inspection apparatus 10 is not limited to a wafer, and may include individualized and packaged semiconductor devices.

Hereinafter, an example in which a device under test inspected by the inspection apparatus 10 is a wafer is mainly described, but one of ordinary skill in the art may easily reach an inspection apparatus 10 for inspecting the semiconductor chip and the semiconductor package based on the description.

Here, two directions parallel to the upper surface of the wafer and perpendicular to each other are defined as the X direction and Y direction, respectively, and a direction perpendicular to the upper surface of the wafer is defined as the Z direction. Unless otherwise specified, the definition of directions is the same even in the following drawings.

Here, the wafer may include, for example, silicon (Si). The wafer may include a semiconductor element, such as germanium (Ge), or a compound semiconductor, such as silicon carbide (SiC), gallium arsenide (GaAs), indium arsenide (InAs), and indium phosphide (InP). According to some embodiments, the wafer may have a silicon on insulator (SOI) structure. The wafer may include a buried oxide layer. According to some embodiments, the wafer may include a conductive region, for example, an impurity-doped well. According to some embodiments, the wafer may have a variety of device separation structures, such as a shallow trench isolation (STI), which separates the doped wells from each other.

The inspection apparatus 10 may inspect the wafer, on which predetermined processes have been performed. Here, the predetermined processes may include various processes for forming a semiconductor device. The predetermined processes may include, for example, an ion doping process, an oxidation process for forming an oxide film, spin coating, a lithography process including exposure and development, a thin film deposition process including chemical vapor deposition (CVD), atomic layer deposition (ALD), physical vapor deposition (PVD), etc., a dry etching process, a wet etching process, a metal wiring process, and the like.

According to embodiments, the inspection apparatus 10 may be an in-line inspection apparatus included in various wafer processing apparatuses. Accordingly, the inspection apparatus may inspect a wafer processed by a wafer processing apparatus in real time. For example, the wafer processing apparatus may include various facilities, such as a stepper-type or scanner-type exposure apparatus, a dry/wet etching facility, a plasma etching facility, a cleaner facility, a plasma asher facility, a polishing facility, such as chemical mechanical polishing (CMP), an ion injection facility, a PVD facility, a CVD facility, an ALD facility, and an annealing facility. However, aspects of the inventive concept are not limited thereto, and the inspection apparatus 10 may be separately provided outside the wafer processing apparatus.

The inspection apparatus 10 may be, for example, a terahertz time domain spectrometer. The inspection apparatus 10 may inspect a wafer by providing a signal having a predetermined frequency band in the terahertz region (e.g., about 0.1 THz to about 10 THz) and then detecting a frequency-intensity distribution of the signal reflected and/or transmitted by the wafer.

The inspection of the wafer may be performed by comparison with a terahertz time domain spectrum for the standard wafer. The inspection of the wafer may be a scanning inspection on the entire surface of the wafer or a spot inspection on a partial area of the wafer.

The data acquisition system 200 may be connected to the cantilever 100.

The data acquisition system 200 may provide an electrical signal for generating a scattering signal to the emitter antenna 150 (see FIG. 1B) of the cantilever 100, and may record a signal detected from the detector antenna 160 (see FIG. 1B). The data acquisition system 200 may be implemented with hardware, firmware, software, or any combination thereof. For example, the data acquisition system 200 may be implemented with a controller and a processor included in a computing device, such as a workstation computer, a desktop computer, a laptop computer, and a tablet computer. The controller and the processor may include a simple controller, a microprocessor, a complicated processor, such as a central processing unit (CPU), a graphics processing unit (GPU), and the like, a processor configured by software, dedicated hardware, or firmware. The controller and the processor may be implemented by, for example, a general-purpose computer or application-specific hardware, such as a digital signal processor (DSP), a field programmable gate array (FPGA), and an application specific integrated circuit (ASIC).

The excitation device 300 may provide first and second laser beams EXB1 and EXB2 for exciting the first and second photoconductive switches 131 and 133 (see FIG. 1B). The excitation device 300 may generate the first and second laser beams EXB1 and EXB2, which are ultra-short waves. The second laser beam EXB2 may be dynamically delayed with respect to the first laser beam EXB1. Accordingly, by scanning the time difference between the second laser beam EXB2 and the first laser beam EXB1, a timing at which the terahertz scattering signal is obtained by the detector antenna 160 (see FIG. 1B) may be found.

First and second nonlinear optical devices 310 and 320 may be arranged on paths of the first and second laser beams EXB1 and EXB2. As a non-limiting example, each of the first and second nonlinear optical devices 310 and 320 may be a simple harmonic generator (SHG), and the first and second laser beams EXB1 and EXB2 may be frequency-double rays. The first and second nonlinear optical devices 310 and 320 may generate, for example, first and second laser beams EXB1 and EXB2 having a wavelength of 780 nm based on a laser beam having a wavelength of 1560 nm.

Figure 3:
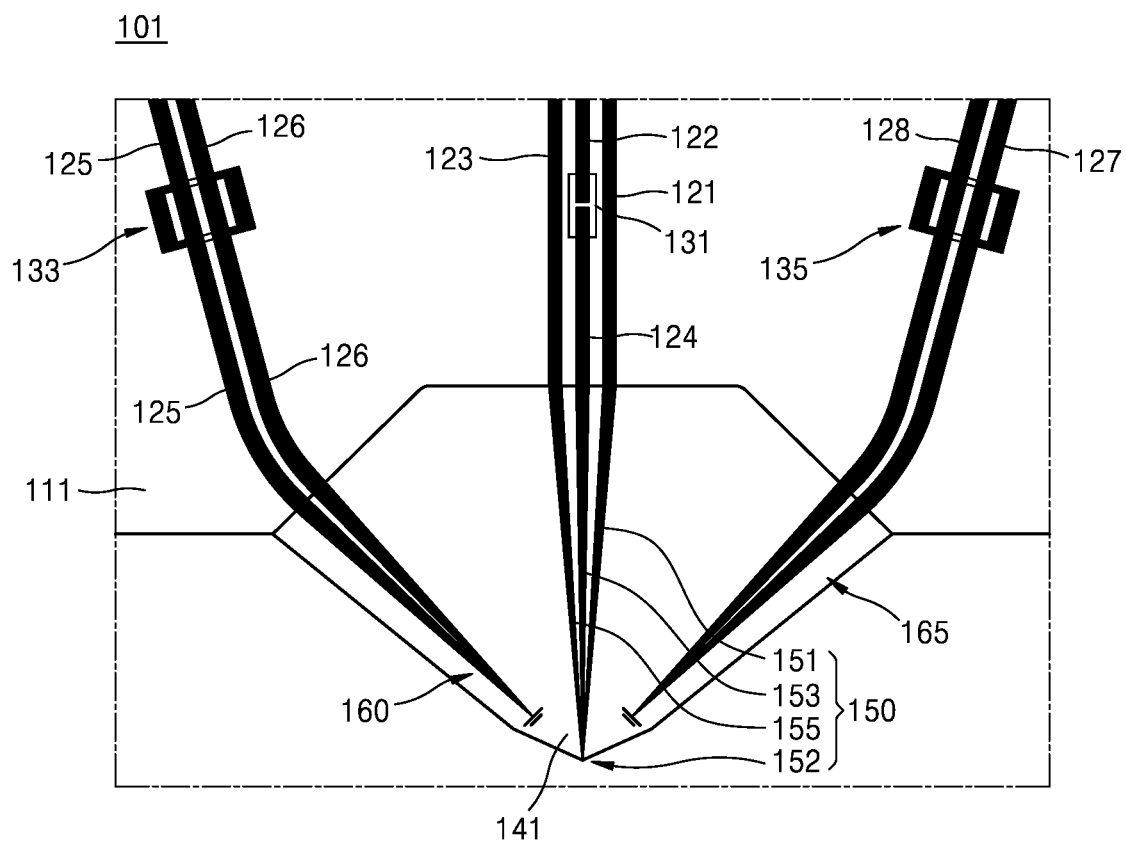
FIG. 3 is a schematic diagram for describing a cantilever according to embodiments.

FIG. 3 is a diagram for describing a cantilever 101 according to embodiments.

Referring to FIG. 3, the cantilever 101 may include a substrate 111, first to eighth conductive lines 121, 122, 123, 124, 125, 126, 127, and 128, first to third photoconductive switches 131, 133, and 135, a microtip 141, an emitter antenna 150, a detector antenna 160, and an additional detector antenna 165.

The first to sixth conductive lines 121, 122, 123, 124, 125, and 126, the first and second photoconductive switches 131 and 133, the emitter antenna 150, and the detector antenna 160 are substantially the same as those described with reference to FIGS. 1A to 1C, and thus, a redundant description thereof is omitted.

The substrate 111 is similar to the substrate 110 of FIGS. 1A to 1C, except that the seventh and eighth conductive lines 127 and 128 are further supported and the microtip 141 is arranged thereon. The microtip 141 is similar to the microtip 140 of FIGS. 1A to 1C, except that the microtip 141 supports the additional detector antenna 165.

According to embodiments, the detector antenna 165 may be connected to the seventh and eighth conductive lines 127 and 128. The third photoconductive switch 135 may be connected to the seventh and eighth conductive lines 127 and 128. When the excitation beam is irradiated onto the third photoconductive switch 135, the third photoconductive switch 135 may be turned on, and accordingly, a signal detected by the detector antenna 165 may be transmitted through the seventh and eighth conductive lines 127 and 128. When the excitation beam is not irradiated onto the third photoconductive switch 135, the third photoconductive switch 135 may be turned off, and accordingly, a signal detected by the detector antenna 165 may not be transmitted through the seventh and eighth conductive lines 127 and 128.

According to embodiments, the detector antenna 165 may be spaced apart from the detector 160 with the emitter antenna 160 in-between. According to embodiments, the detector antennas 160 and 165 may be symmetrical with respect to the emitter antenna 150. According to embodiments, the detector antennas 160 and 165 may be symmetrical with respect to the second emitter electrode 153 of the emitter antenna 150.

According to embodiments, the detector antenna 165 may be a dipole antenna. According to embodiments, the detector antenna 165 may be oblique to the emitter antenna 150. According to embodiments, the extending direction of the detector antenna 165 may be oblique to each of the first to third emitter electrodes 151, 153, and 155.

According to embodiments, the angle between the extending direction of the detector antenna 165 and the second emitter electrode 153 may have a value selected from a range of about 30 degrees to about 60 degrees. According to embodiments, the angle between the extending direction of the detector antenna 165 and the second emitter electrode 153 may have a value selected from a range of about 40 degrees to about 50 degrees. According to embodiments, the angle between the extending direction of the detector antenna 165 and the second emitter electrode 153 may be about 45 degrees.

The detector antenna 165 may be spaced apart from the scattering part 152 by a predetermined distance. The distance between the detector antenna 165 and the scattering part 152 may have a value selected from a range of about 100 μm to about 200 μm. The distance between the detector antenna 165 and the scattering part 152 may be about 150 μm or more. The distance between the detector antenna 165 and the scattering part 152 may be about 185 μm.

According to embodiments, the signal detected by the detector antenna 165 may be used to compensate for non-scattering background noise in the signal detected by the detector antenna 160. Accordingly, the signal to noise ratio of measurement using the cantilever 101 may be increased.

While the inventive concept has been particularly shown and described with reference to embodiments thereof, it will be understood that various changes in form and details may be made therein without departing from the spirit and scope of the following claims.

What is claimed is:

1. A cantilever comprising:
a substrate;
a first conductive line, a second conductive line, and a third conductive line extending on the substrate
a microtip arranged on the substrate;
an emitter antenna arranged on the microtip, connected to the first to third conductive lines, and configured to produce a scattering signal of a terahertz wave band; and
a detector antenna arranged on the microtip, and adjacent to the emitter antenna,
wherein the emitter antenna comprises:
a first emitter electrode connected to the first conductive line;
a second emitter electrode connected to the second conductive line and adjacent to the first emitter electrode;
a third emitter electrode connected to the third conductive line and spaced apart from the first emitter electrode with the second emitter electrode in-between; and
a scattering part connecting the first and second emitter electrodes with each other.

2. The cantilever of claim 1, wherein the scattering part has a round shape.

3. The cantilever of claim 1, wherein the radius of the scattering part has a value selected from a range of about 10 nm to about 10 μm.

4. The cantilever of claim 1, wherein the radius of the scattering part has a value selected from a range of about 100 nm to about 3 μm.

5. The cantilever of claim 1, wherein the microtip comprises low temperature gallium arsenide or indium gallium arsenide.

6. The cantilever of claim 1, wherein the detector antenna is oblique to the emitter antenna.

7. The cantilever of claim 1, wherein the detector antenna is oblique to the second emitter electrode.

8. The cantilever of claim 1, wherein the angle between the extending direction of the detector antenna and the second emitter electrode has a value selected from a range of about 30 degrees to about 60 degrees.

9. The cantilever of claim 1, wherein the angle between the extending direction of the detector antenna and the second emitter electrode is about 45 degrees.

10. The cantilever of claim 1, wherein the distance between the detector antenna and the scattering part has a value selected from a range of 100 μm to 200 μm.

11. The cantilever of claim 1, wherein the width of each of the first to third emitter electrodes decreases towards the scattering part.

12. The cantilever of claim 1, wherein the distance between any two of the first to third emitter electrodes decrease towards the scattering part.

13. A cantilever comprising:
a first conductive line, a second conductive line, and a third conductive line extending on a substrate;
a microtip arranged on the substrate;
an emitter antenna arranged on the microtip, connected to each of the first to third conductive lines, and configured to produce a scattering signal of a terahertz wave band; and
a detector antenna arranged on the microtip, and adjacent to the emitter antenna,
wherein the first to third conductive lines comprise parts extending side-by-side.

14. The cantilever of claim 13, further comprising a photo switch located between the second conductive line and the emitter antenna.

15. The cantilever of claim 14, wherein the photo switch comprises low temperature gallium arsenide or indium gallium arsenide.

16. The cantilever of claim 14, further comprising a fourth conductive line located between the photo switch and the emitter antenna and arranged in a line with the second conductive line.

17. The cantilever of claim 13, wherein the first to third conductive lines form a co-planar waveguide structure.

* * * * *